May 6, 1941. C. A. CARSON Re. 21,790
ELEVATOR CONTROL-SIGNAL SYSTEM
Original Filed July 23, 1938 2 Sheets-Sheet 1
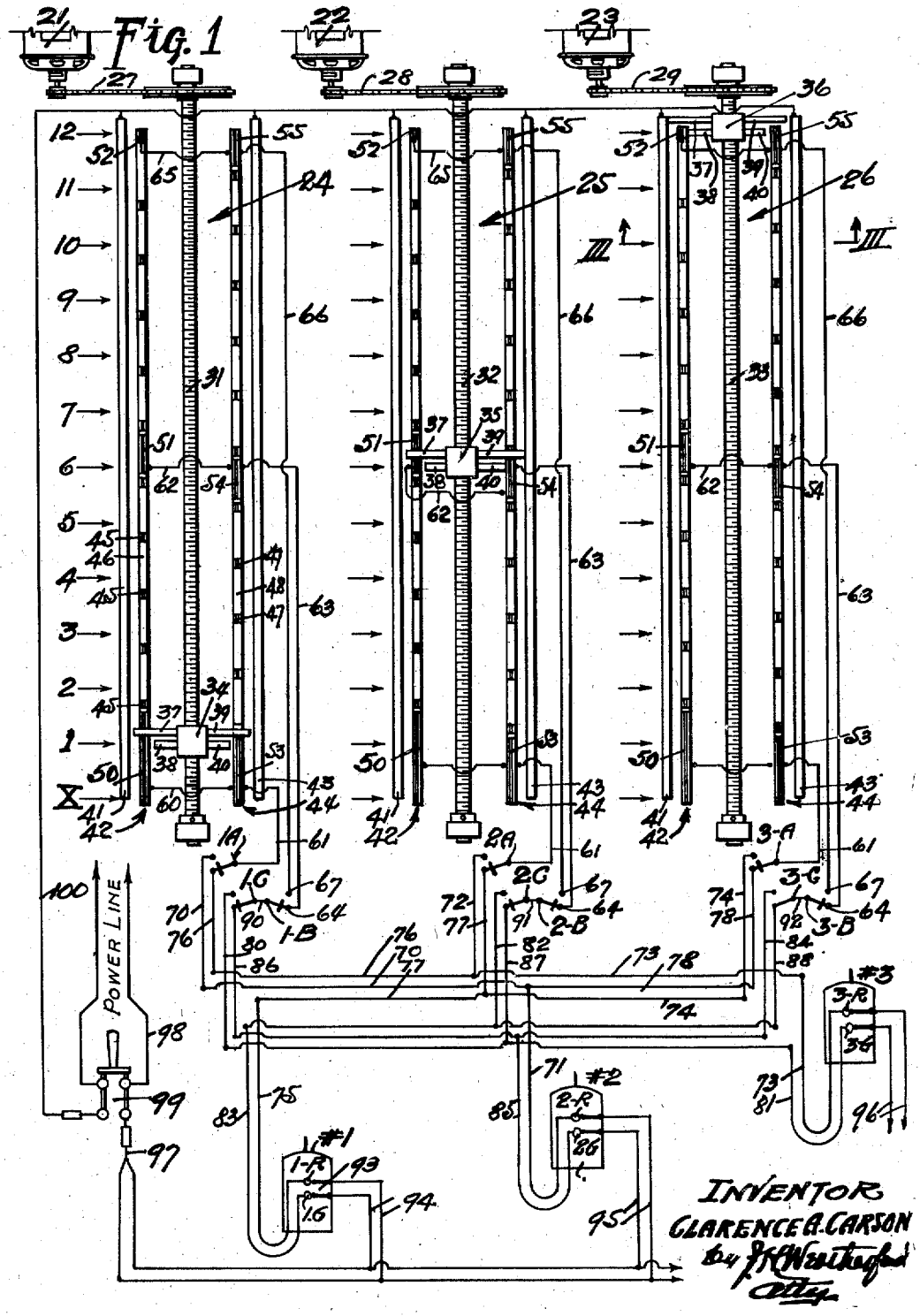

May 6, 1941. C. A. CARSON Re. 21,790
ELEVATOR CONTROL-SIGNAL SYSTEM
Original Filed July 23, 1938 2 Sheets-Sheet 2
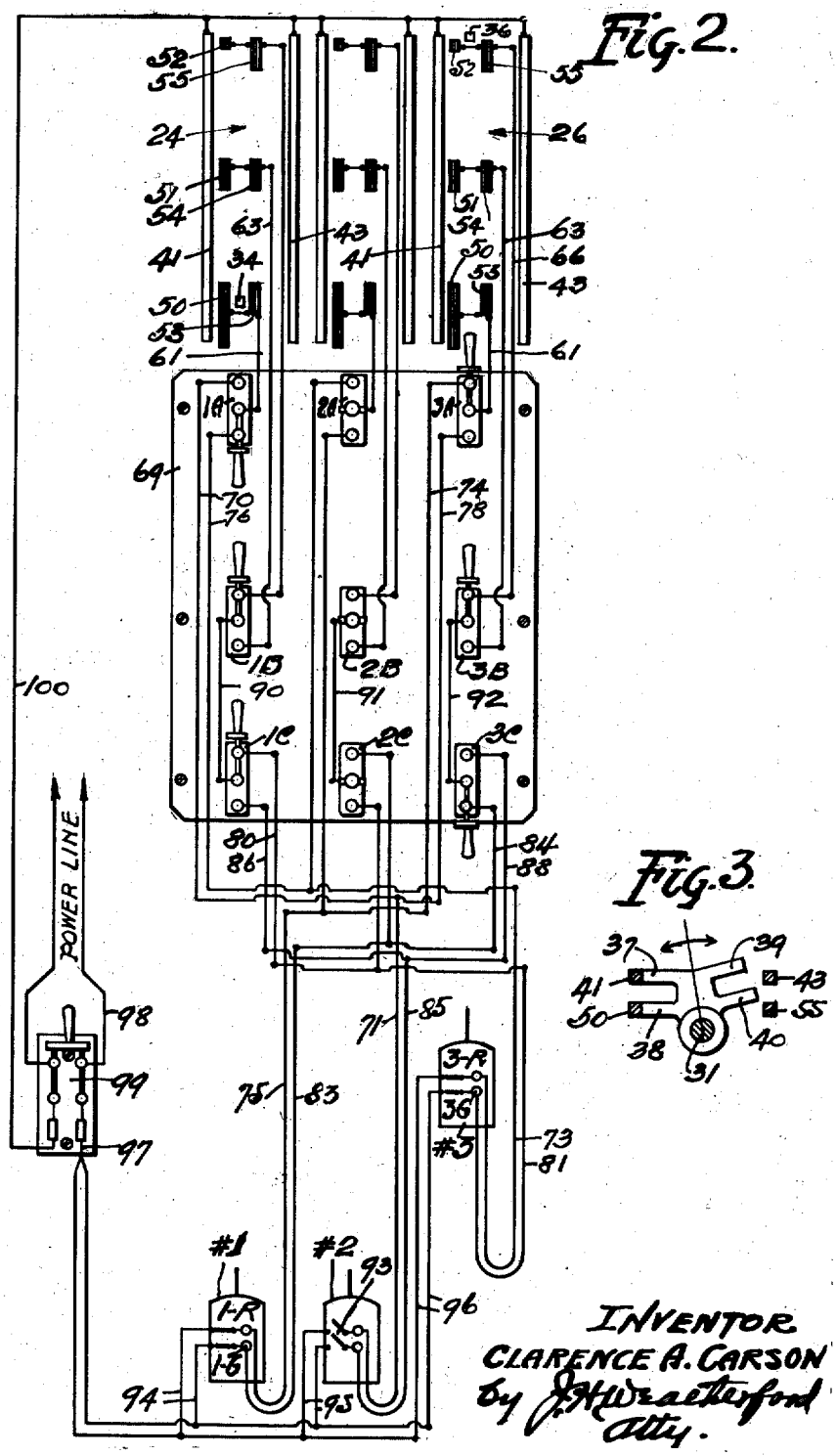

Reissued May 6, 1941 Re. 21,790

UNITED STATES PATENT OFFICE 21,790

ELEVATOR CONTROL-SIGNAL SYSTEM

Clarence A. Carson, Memphis, Tenn., assignor of one-half to Dr. Milton B. Seligstein, Memphis, Tenn.

Original No. 2,224,808, dated December 10, 1940, Serial No. 220,905, July 23, 1938. Application for reissue February 15, 1941, Serial No. 379,132

16 Claims. (Cl. 177—336)

This invention relates to automatic signalling system for indicating to the operators of each of a bank of elevators the position of other cars in the bank in order that the operators may know without directions by a starter the proper time for them to leave the top and bottom of their runs and the time to pass intermediate positions in the run.

In the operation of elevators there is a tendency, because of the unequal flow of travel in opposite directions during the day, for the elevators to become bunched at the top or the bottom, and in the absence of a starter, to run in groups with the result that there are excessive periods at both ends of the run when no cars are available and other periods in which all the cars are available. Such conditions arise in the morning when the heavy travel is all upward, at the beginning of the lunch period when the heavy travel is largely downward; at the close of the lunch period when the heavy travel is again upward and at the end of the working day when the travel is downward.

Elevators are ordinarily arranged in office buildings in groups, a selected number of adjacent elevators being operated as a unit. In the present instance a bank of three elevators has been selected for purposes of illustration of a unit, in which the position indicating signals and the controls therefor have been interconnected to effect the desired result in such bank, and switching means has been introduced through which the signals on any one of the elevators of the bank may be disconnected and the other two elevators of the bank may be properly interconnected.

A twelve story building with basement has been selected for the installation, control points in such case being chosen at the top, sixth and ground floors. Obviously taller or lower buildings may be equipped, controls usually being in all cases at the top, middle and lower floors.

It will be understood that indicators have been made which show continuously in one car, the position of an adjacent car, but such indicators require more or less constant observation and furnish no indication of the position of a third car, such systems as known lacking flexibility and more or less requiring operation of the cars of a unit in a fixed cycle, and also requiring operation of all the cars in the unit.

The objects of the present invention are:

To provide an indicating system in the elevators themselves by which the arrival of the elevators at certain floors is indicated to the other elevators of the bank, in order that the operators of such other elevators may be properly advised as to what their movement should be.

A further object is to provide switching means whereby the system may be changed over and any selected one of the elevators be eliminated during such periods as require operation of less than the maximum number of elevators.

The means by which the foregoing and other objects are accomplished, and the manner of their accomplishment will readily be understood from the following specification on reference to the accompanying drawings, in which:

Fig. 1 is a diagrammatic sketch emphasizing the floor control mechanism and showing the wiring circuit properly connected for operation of a unit comprising a bank of three cars.

Fig. 2 is a diagrammatic sketch of the same wiring system emphasizing the switch board, the switchings being thrown to interconnect the first and third cars of a unit comprising a three car bank with the second car idle.

Fig. 3 is a section as on the line III—III of Fig. 1 showing the actual relation between the screw, the head and contact arms carried thereby, and the commutator bars.

Referring now to the drawings in which the various parts are indicated by numerals:

The floors are indicated by the numbers 1 to 12 inclusive and the basement by X.

#1, #2 and #3 are respectively three elevators comprising a related group or bank of elevators which are to be operated as a unit. 21, 22, and 23 are motors through which these three elevators are respectively lowered and raised in usual manner, the motors running in one direction to raise the elevator and in the opposite to lower the elevator.

24, 25, and 26 diagrammatically indicate mechanisms of well known type through which the electric signal circuits of the present day elevators are controlled, these mechanisms being directly connected to the three motors 21, 22 and 23, respectively, by suitable speed reduction mechanism here indicated by sprocket pinion, chain, and gear, assemblies 27, 28, and 29 respectively, such part only of these mechanisms being shown as relate to the present installation.

In these mechanisms 31, 32, and 33 are screws responsive to the movement of the motors 21, 22, 23, these screws shifting heads 34, 35, and 36 which each carry oppositely disposed arms in pairs 37, 38, and 39, 40, the pair of arms 37, 38 cooperating with a continuous commutator bus bar 41 and an interrupted commutator bar 42 on the downward movement of their respective elevators, and the arms 39, 40, with a similar pair of commutator bars 43, 44 on the upward movement of the same elevators. The shift of one or the other set of arms into contact with these busses is accomplished in manner usual in machines of this type by lost motion of the head 34 as the screw 31 turns to left or right as the case may be (see Fig. 3).

In the present instance the bars used are the set-back feed bars, and set-back bars respectively, being the pairs of bars that cut off the elevator lantern lights as the cars leave the various floors. The continuous bar in each case is used without change, but the interrupted bars, which for the lantern lights carry set-back contacts 45 for each of the floors except the top and first floor on the downward movement of the elevator, with insulated portions 46 interposed therebetween; and contacts 47 for each of the floors, except the top floor, with interposed insulated portions 48, for the upward movement have been modified by adding additional contacts 50, 51, and 52 on the down bar 42, and contacts 53, 54, and 55 on the up bar 44, these contacts being insulated from the adjacent set-back contacts 45 and 47 respectively.

The contact 52 at the top floor is of restricted size and usable only when the car is at the top floor. The contact 51 begins above the sixth floor and extends thereto, and the contact 50, above the first floor and extends continuously past the first floor and to the basement level in order that the contacts may not be discontinued should the car descend into the basement.

On the up bus bar the contact 53 begins at the basement level and extends to the first floor level. The contact 54 begins above the fifth floor and extends to the sixth floor, and the contact 55 below the top floor and extends to such floor. The wiring for the lantern light contacts not being here involved has been omitted.

The contacts 50 and 53 are interconnected by a lead 60 and the two contacts thus interconnected are connected by a lead 61 to a double throw, single pole switch 1—A. The contacts 51 and 54 are interconnected by a lead 62 and the thus interconnected contacts by a lead 63 to one pole 64 of a double throw, single pole switch 1—B. The two top contacts are interconnected by a lead 65 and the thus interconnected contacts are connected by a lead 66 with the second pole 67 of the switch 1—B. The switch 1—B is connected by a lead 90 with a double throw, single pole switch 1—C.

Similar double throw switches, 2—A, 3—A; 2—B, 3—B, and 2—C, 3—C, are provided and similarly connected to the contacts of the other two control mechanisms 25, 26, which are operated by the motors of elevators #2 and #3.

For convenience in operation, the nine switches thus described are arranged on a switch board 69, the switches being positioned on the board so that they have a vertical throw. The A switches, 1—A, 2—A, and 3—A, are arranged in one horizontal bank, the switches 1—B, 2—B, and 3—B, in a second horizontal bank; the 1 switches, the 2 switches and the 3 switches of the banks being respectively in vertical rows. And, for further convenience during use, the connections to the poles of these switches are so made that with all of the elevators in use the handles of all the switches will extend downward, and the description here following of the pole connections is based on such switch handle positioning.

The upper poles of switches 1—A, 2—A and 3—A are respectively connected by leads 70, 71; 72, 73; and 74, 75 with red signal lights 2—R, 3—R, and 1—R on the elevators #2, #3 and #1 respectively. The lower poles of these same three switches are connected by a lead 76 and the lead 73; a lead 77 and the lead 75; and a lead 78 and the lead 71; with the red lights 3—R, 1—R and 2—R of the elevators #3, #1 and #2 respectively.

The upper poles of the switches 1—C, 2—C and 3—C are respectively connected by leads 80, 81; leads 82, 83; and leads 84, 85; with the green lights G—3, G—1 and G—2 of elevators #3, #1 and #2 respectively. The lower poles of these same three switches are connected by a lead 86 and the lead 85 with the green light G—2, by a lead 87 and the lead 81 with the green light G—3; and by a lead 88 and the lead 83 with the green light G—1.

The switches 1—B and 1—C are connected by a lead 90; the switches 2—B and 2—C by a lead 91, and the switches 3—B and 3—C by a lead 92.

The red and green signal lights of the three cars are connected by suitable leads 94, 95 and 96 with one leg 97 of a power line 98. 99 is a double pole, single throw switch controlling the incoming power line. 100 is a joint return lead to the power line from the commutator bars 41, 43 of the machines 24, 25 and 26. In Fig. 1 the handles of all the switches are shown as thrown downward so that each of these switches is closed through the lower of its two poles. In this position of the switches the device is set to provide operating signals on the three car bank of elevators.

The red lights indicate to the operator of a car as they flash on that the preceding car has reached the ground floor and as they go off that that car has left the ground floor and that he should reach that floor as soon as possible. The green lights indicate to the operator of a car on the ground floor, or leaving that floor, that the following car on its way down has reached the intermediate control floor and that he should leave the ground floor as soon as possible. They also indicate to the operator of a car near the top of its run or starting down that the following car has passed the similar intermediate control floor on its way up and that he should be on his way down.

In operation, Fig. 1 is illustrative of conditions arising under heavy upward travel and light downward travel. Car #1 is shown as loading at the first floor, car #2 at floor 6 going up and car #3 at floor 12 starting down, with presumably a very light run ahead and even a possibility of reaching floor 1 before car #1 can leave which is undesirable.

Car #1 at the ground floor is shown with the head 34 shifted to the left in the position which it had at the end of its downward run, and the arms 37 and 38 in contact with the bar 41 and contact 50 of machine 24 establishing a circuit through the leads 60, 61, the switch 1—A, and the leads 76, 73 to the red light 3—R of car #3, here shown at the top floor, but which car may be at any position of its run, the operator of such car being notified by such red signal that a car is on the bottom floor discharging or receiving passengers, and that so long as the red signal persists he must not pass a designated control position on his downward trip even though he should start such downward trip before the red signal is cleared.

Elevator #2 is shown at floor 6 on its way up with head 35 swung to the right and the contact arms 39, 40 carried by such head establishing a circuit through the bar 43 and contact 64, lead 63, switches 2—B, 2—C, and leads 87, 81 to green light 3—G of elevator #3, such signal in car #3 advising the operator of that car that an elevator is passing floor 6 on its way up and that he should be on his way down from the top floor.

Car #3 is shown at the top of its run starting down, with the head 36 shifted to the left and contacts established through its arms 37, 38 with the left commutator bar 41 and control 52, but the leads 65, 66 from such contact extend to the open pole 67 of switch 3—B and establish no light circuit.

As car #1 subsequently starts up, head 34 shifts to the right breaking the circuit through bar 41 and contact 50, but establishing contacts through the right hand bar 43, and contact 53 and re-establishing the momentarily discontinued red signal in car #3, however, upward movement of the car cuts off this signal. Car #3 in the meantime should have reached floor 6 in its downward movement, and in passing from floor 7 to floor 6 arm 38 of head 36 has engaged related contact 51 of machine 26 and through leads 62, 63, of such machine, switches 3—B, 3—C and leads 88, 83 has flashed on green signal 1—G, indicating to the operator of car #1 that car #3 is approaching floor 1 in its proper timing and turn.

Should any car after leaving the top floor fail to receive a red signal, that car is on notice that the preceding car has not reached the ground floor and if that signal is not received after a considerable portion of the downward trip has been made, the operator knows that a delay has occurred to the car in advance. If such signal is not received before the intermediate control floor is reached, the car should continue without wait to the ground floor but is under notice that it is overtaking or has passed the car due to precede it. If the ground floor is reached before the signal is received the car has been passed and immediate steps should be taken to locate and correct the trouble. Should however the red signal come on during the downward trip, the car should slow down and endeavor not to reach the ground floor until the signal is cancelled and notice thereby given that the preceding car has left that floor. Each car is due to receive from the following car a green signal indicating that he should leave the ground floor. Until this signal is received the car operator knows that the following car has not reached the control floor on its way down, nevertheless when he has loaded he starts his upward trip. If during this upward trip he does not receive a green signal he knows that the following car is in trouble. On the other hand if the starting signal is received he knows that the following car should later give him a green signal indicating that he should leave the top floor and if this signal is not received before the down trip is completed, he knows that the following car has not passed the control station on its way up and is in trouble. Both operating cars would thus in less than a complete trip be advised of the delay to the other car and such steps as might be necessary would be taken to locate the trouble. If trouble persists, two car operation would be resorted to.

With the trouble corrected, three car operation would be resumed by bringing the restored car to either the ground floor or top floor and letting it load and leave such floor next after the car due to precede it has left. Attention to the signal lights would then automatically reestablish the operating cycle.

Should it be desired to operate two cars only of the unit, any one of the cars may be cut out and the signals of the other two connected for operation. In this case it is preferred that the green signal be controlled from the top floor instead of from an intermediate floor which latter was preferable in three car operation.

In Fig. 2 the center car, #2 of the unit, is out of operation and cars #1 and #3 are being operated, car #1 being shown at the ground floor and car #3 at the top floor. To effect discontinuance of the signals to and from car #2, switches 2—A, 2—B and 2—C should be opened, particularly if the car is to be moved from the ground floor as for odd trips, though if the car is to remain at the ground floor, opening of switch 2—A is all that is necessary. In Fig. 2 switches 2—A, 2—B and 2—C are shown open. Usually also the operator of a car opens the double pole switch 93 whenever he leaves the car and such switch therefore is also shown open.

Switch 1—A is shown with the switch handle downward, establishing connection from contacts 50, 53, to lead 61, leads 76 and 73 to red signal light 3—R in car #3. Switch 3—A is shown with the handle thrown upward, establishing connection between its related contacts 50, 53, through its lead 61, and leads 74 and 75 to red signal light 1—R of car #1. Switches 1—B and 3—B are both shown with their handles thrown upward, establishing connection from the contacts 52, 55, through lead 66 and leads 90, 92 respectively, to switches 1—C and 3—C respectively, connection being thereby discontinued from contacts 51, 54 in both cases. Switch 1—C is shown with the handle thrown upward, establishing connection from switch 1—C through leads 80, and 81 with the green signal light 3—G of car #3. Switch 3—C is shown with the handle thrown downward, establishing connection through leads 84 and 83 to green signal light 1—G in car #1.

With car #1 at the ground floor, head 34 establishes through its arms (omitted in this view for clearness), engagement with contacts 50, 53 and through leads 61, 76 and 73 flashes a red signal in car #3, this signal being maintained so long as car #1 is at the ground floor, no matter what the position of car #3 may be, and indicating by its discontinuance that car #1 has left the ground floor and is on its way upward. Concurrently car #3 reaching the top floor establishes contact through head 36 with contacts 52, 55, and through leads 66, 92, 84 and 83, establishes a circuit to the green signal light 1—G in elevator #1, advising the operator of that elevator that #3 car has reached the top floor and is ready to descend. If upward travel is the heavier the car loading at the bottom floor leaves as promptly as possible and by the discontinuance of this red signal the operator of car #3 is advised that he must reach and leave the top floor as soon as he can. Operator of car #1 is notified by flashing of the green signal when car #3 reaches and is at the top floor, and is subsequently notified of the arrival of car #3 at the bottom floor, the two operators being enabled by this interchange of signals to keep their upward and downward runs balanced and properly spaced.

It will be understood that the intermediate contact points shown and described throughout as coordinated with the sixth or middle floor relate to a twelve story building and even so may be, and possibly should be, positioned to coordinate with some other floor, as the seventh or eighth; and also that particularly when such controls are coordinated with floors as high as the eighth of such twelve story building, a two-car unit might readily be operated without shifting the control of the green lights from such intermediate floor to the top floor.

As has been hereinbefore stated the building selected for illustration is a twelve story building and in the specification reference has been made indiscriminately to the sixth floor or the middle floor, but it will be distinctly understood that should the building be a taller building, as a twenty story building, the intermediate floor on the same basis would obviously be the tenth floor or an even higher floor if desired.

While a particular type of double throw switch is shown and described throughout, it is obvious that other well known types of such switches, such as push button switches, may be substituted for the handle switches without departing from the spirit of my invention.

I claim:

1. In a signal system for elevators operating in three car units between upper and lower control floors and passing an intermediate control floor, each said car having a first and a second distinctively different signal light mounted therein, means respectively each synchronized with movement of a said car for energizing a said first light as said car approaches said lower control floor and for deenergizing said first light as said car leaves said floor, related synchronized means each for energizing a said second light as its respective car approaches said intermediate or upper floors, and for denergizing said second light as said car leaves said intermediate or upper floors; means manually operable for selectively rendering said related synchronized means inoperable at said intermediate or upper control floors; means connecting the first said synchronized means of a first said car with a first said light of a second said car, means connecting the first said synchronized means of said second car with a first said light of the third said car, and means connecting the first said synchronized means of said third car with a first said light of said first car; means connecting said related synchronized means of said first car with the second said light of said third car, means connecting said related synchronized means of said second car with the second said light of said first car, and means connecting said related synchronized means of said third car with the second said light of said second car.

2. In a signal system for elevators operating in three car units between upper and lower control floors and passing an intermediate control floor, each said car having a red and a green signal light mounted therein, means, respectively each synchronized with movement of a said car for energizing a said red light as said car approaches said lower control floor and for deenergizing said light as said car leaves said floor, related synchronized means each for energizing a said green light as its respective said car approaches said intermediate or upper floors and for deenergizing said green light as said cars leave said intermediate or upper floors; means manually operable for selectively rendering said related synchronized means inoperable at said intermediate or said upper control floors; means connecting the first said synchronized means of a first said car with a said red light of a second said car, means connecting the first said synchronized means of said second car with a said red light of said third car, means connecting the first said synchronized means of said third car with a said red light of said first car, means connecting said related synchronized means of said first car with said green light of said third car, means connecting the said related synchronized means of said second car with said green light of said first car, and means connecting the second said synchronized means of said third car with said green light of said second car.

3. In a signal system for elevators operating in three car units between upper and lower floors, each said car having a stop and go signal light mounted therein, means respectively each synchronized with movement of a said car for energizing a said stop light as said car approaches said lower floor and for deenergizing said stop light as said car leaves said floor, related synchronized means each for energizing a go light as said car approaches a selected intermediate floor and for deenergizing said go light as said car leaves said floor; means connecting the first said synchronized means of a first said car with a said stop light of a second said car, means connecting the first said synchronized means of said second car with a said stop light of the third said car; and means connecting the first said synchronized means of said third car with a said stop light of said first car; means connecting said related synchronized means of said first car with the said go light of said third car, means connecting said related synchronized means of said second car with the said go light of said first car, and means connecting said related synchronized means of said third car with the said go light of said second car.

4. In an elevator signal system, the combination with an operating unit comprising three elevators, a stop and a go signal light mounted in each of said elevators, a switch board having three banks each comprising three single pole, double throw switches, circuit leads one from each of said lights to said switch board, said lead from said stop light of a first elevator being connected to oppositely disposed poles of the second and third switches of a first said bank, said lead from said stop light of the second said elevator being connected to the remaining pole of the third switch and the opposite pole of the first switch of said first bank, and said third lead from the first light of said third elevator being connected to the remaining poles of said first and second switches of said first bank; said leads from said go lights of said first, second and third elevators being respectively similarly connected to poles of the second and third, the third and first, and the first and second of the second bank of said switches, leads connecting the first, second and third switches of said first bank respectively with the first, second and third switches of the third of said banks; means for energizing said lights, synchronized respectively with movement of said first, second and third elevators having control points corresponding to the lower, an intermediate and the upper floor of said building in which said elevators are installed, leads respectively connecting the first, second and third switches of said first bank of switches with the lower control points of said synchronized means of said first, second and third elevators respectively, leads respectively connecting one pole of each switch of said third bank of switches with said intermediate control points of said synchronized means of said first, second and third elevators respectively, and leads respectively connecting the other pole of each of said switches of said third bank with said upper floor control points of said first, second and third elevators respectively.

5. In an elevator signal system, the combination with an operating unit comprising three elevators, a stop and a go signal light mounted in each of said elevators, means, synchronized respectively each with movement of a said elevator, for energizing said lights, said means having control points corresponding to the lower, an intermediate, and the upper floor of the building in which said elevators are installed; means connecting said stop lights of said first, second, and third elevators respectively with the second, third, and first lower control points of said synchronized means, and means connecting the said go lights of said first, second, and third elevators respectively with the intermediate control points of said third, first, and second control means.

6. In an elevator signal system, the combination with an operating unit comprising three elevators, a red and a green signal light mounted in each of said elevators, means synchronized respectively each with movement of a said elevator, for energizing said lights, said means having control points corresponding to the lower, an intermediate, and the upper floor of the building in which said elevators are installed; means connecting said red lights of said first, second, and third elevators respectively with the second, third, and first lower control points of said synchronized means, and means connecting said green lights of said first, second and third elevators respectively with the intermediate control points of said third, first, and second control means.

7. In an elevator signal system, the combination with an operating unit comprising three elevators, a stop and a go signal light mounted in each of said elevators, means synchronized respectively each with movement of said elevator, for energizing said lights, said means having control points corresponding to the lower, an intermediate, and the upper floor of the building in which said elevators are installed, means connecting the said stop lights of said first, second, and third elevators respectively with the second, third, and first lower control points of said synchronized means, means connecting the said go lights of said first, second, and third elevators respectively with the intermediate control points of said third, first, and second control means, means, each for cutting out the signal lights of a said elevator, means, each for shifting connection of a said second light to said upper control point, and means for connecting both of the signal lights of each of the remaining two cars with the respective related lower and upper control points of the other of said cars.

8. In an elevator signal system, the combination with an operating unit comprising a plurality of elevators, a stop and a go signal light mounted in each of said elevators, means synchronized respectively each with movement of a said elevator for energizing said lights, said means having control points corresponding to the lower, an intermediate, and an upper floor of the building in which said elevators are installed; means connecting said stop lights of the first and succeeding said elevators respectively with the second and in cycle succeeding, lower control points of said synchronized means, and means connecting the said go lights of said first and succeeding elevators respectively with the intermediate control points of the third, and in cycle succeeding, said control means.

9. In an elevator signal system, the combination with an operating unit comprising a plurality of elevators, a red and a green signal light mounted in each of said elevators, means synchronized respectively each with movement of a said elevator, for energizing said lights, said means having control points corresponding to a lower, an intermediate, and an upper floor of the building in which said elevators are installed; means connecting said red lights of the first, and succeeding said elevators respectively with the second, and in cycle succeeding lower control points of said synchronized means, and means connecting said green lights of said first, and succeeding elevators respectively with the intermediate control points of the third, and in cycle succeeding, said control means.

10. In an elevator signal system, the combination with an operating unit comprising a pair of elevators, a stop light and a go light mounted in each of said elevators, means synchronized respectively each with movement of a said elevator for energizing said lights, said means having control points corresponding to the lower and an upper floor of the building in which said elevators are installed; and means operably connecting the stop lights and go lights respectively of each said elevator with the lower and upper control points respectively of the energizing means synchronized with the other said elevator.

11. In an elevator signal system, the combination with an operating unit comprising a pair of elevators, a red light and a green light mounted in each of said elevators, means synchronized respectively each with movement of a said elevator, for energizing said lights, said means having control points corresponding to the lower and an upper floor of the building in which said elevators are installed; and means operably connecting the red and green lights respectively of each said elevator with the lower and upper control points respectively of the energizing means synchronized with the other said elevator.

12. In an elevator signal system, the combination with an operating unit comprising a plurality of elevators, a stop and a go signal light mounted in each of said elevators, means synchronized respectively each with movement of a said elevator for energizing said lights, said means having control points corresponding to floors of the building in which said elevators are installed; means connecting the said stop lights of each said elevator respectively with the lower control point of said synchronized means of the following elevator, and means connecting another said control point of each said control means respectively with the go light of the preceding elevator.

13. In an elevator signal system, the combination with an operating unit comprising a plurality of elevators, a stop and a go signal light mounted in each of said elevators, means synchronized respectively each with movement of a said elevator for energizing said lights, said means having control points corresponding to floors of the building in which said elevators are installed; means connecting the said stop lights of each said elevator respectively with the lower control point of said synchronized means of the following elevator, and means connecting an upper of said control points of each said control means with the go light of the preceding elevator.

14. In an elevator signal system, the combination with an operating unit comprising a plurality of elevators, a stop and a go signal light mounted in each of said elevators, means synchronized respectively each with movement of a said elevator for energizing said lights, said means having control points corresponding to floors of the building in which said elevators are installed; means connecting the said stop lights of each said elevator respectively with the lower control point of said synchronized means of the following elevator, means connecting another said control point of each said control means respectively with the go light of the preceding elevator, and means each for independently shifting a said latter control point.

15. In an elevator signal system, the combination with an operating unit comprising a plurality of elevators, a stop and a go signal light mounted in each of said elevators, means synchronized respectively each with movement of a said elevator for energizing said lights, said means having control points corresponding to the lower, an intermediate, and an upper floor of the building in which said elevators are installed; means connecting said stop lights of the first and succeeding said elevators respectively with the second and in cycle succeeding, lower control points of said synchronized means, means connecting the said go lights of said first and succeeding elevators respectively with the intermediate control points of the third, and in cycle succeeding said control means, means each for cutting out the signal lights of a said elevator and means for interconnecting the signal lights of the remaining said elevators in similar said cycle sequences.

16. In an elevator signal system, the combination with an operating unit comprising a plurality of elevators, a red and a green signal light mounted in each of said elevators, means synchronized respectively each with movement of a said elevator, for energizing said lights, said means having control points corresponding to a lower, an intermediate, and an upper floor of the building in which said elevators are installed; means connecting said red lights of the first, and succeeding said elevators respectively with the second, and in cycle succeeding lower control points of said synchronized means, means connecting said green lights of said first, and succeeding elevators respectively with the intermediate control points of the third, and in cycle succeeding said control means, means each for cutting out the signal lights of a said elevator and means for interconnecting the signal lights of the remaining said elevators in similar said cycle sequences.

CLARENCE A. CARSON.